US012470884B2

(12) United States Patent
Wu

(10) Patent No.: US 12,470,884 B2
(45) Date of Patent: Nov. 11, 2025

(54) AUDIO PLAYING METHOD AND DEVICE, STORAGE MEDIUM, AND MOBILE TERMINAL

(71) Applicant: JRD COMMUNICATION (SHENZHEN) LTD., Guangdong (CN)

(72) Inventor: Taiyun Wu, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 243 days.

(21) Appl. No.: 18/322,645

(22) Filed: May 24, 2023

(65) Prior Publication Data

US 2023/0300549 A1 Sep. 21, 2023

Related U.S. Application Data

(63) Continuation of application No. PCT/CN2020/134854, filed on Dec. 9, 2020.

(30) Foreign Application Priority Data

Nov. 24, 2020 (CN) ........................ 202011329612.7

(51) Int. Cl.

*H04S 1/00* (2006.01)
*H04R 29/00* (2006.01)
*H04S 5/02* (2006.01)

(52) U.S. Cl.

CPC ......... *H04R 29/002* (2013.01); *H04R 29/008* (2013.01); *H04S 1/002* (2013.01); *H04S 5/02* (2013.01)

(58) Field of Classification Search

CPC ...... H04R 3/12; H04R 29/001; H04R 29/002; H04R 3/00; H04S 7/00; H04S 1/002; H04S 5/02; H04S 7/40

(Continued)

(56) References Cited

U.S. PATENT DOCUMENTS 4,308,424 A * 12/1981 Bice, Jr. .................... H04S 5/02 381/17
5,109,416 A * 4/1992 Croft ........................ H04R 5/02 381/1

(Continued)

FOREIGN PATENT DOCUMENTS

CN 101035226 A 9/2007
CN 201057665 Y 5/2008

(Continued)

OTHER PUBLICATIONS

International Search Report in International application No. PCT/CN2020/134854, mailed on Aug. 23, 2021.

(Continued)

*Primary Examiner* — Disler Paul
(74) *Attorney, Agent, or Firm* — PV IP PC; Wei Te Chung

(57) ABSTRACT

The present application provides an audio playing method, including: when an audio signal to be played is detected, storing the audio signal in a preset buffer while transmitting the audio signal to the auxiliary speaker to enable the auxiliary speaker to play the audio signal; initiating a timer to start timing in a process of storing the audio signal; and when a timing duration for which the timing lasts reaches a preset delay duration, obtaining the audio signal from the preset buffer and transmitting the audio signal to the main speaker to enable the main speaker to play the audio signal.

17 Claims, 4 Drawing Sheets

(58) Field of Classification Search
USPC ............................ 381/59, 61, 104–109, 303
See application file for complete search history.

(56) References Cited

U.S. PATENT DOCUMENTS

| | | | | |
|---|---|---|---|---|
| 7,848,882 | B2 * | 12/2010 | Kawai | B60K 35/10 345/169 |
| 9,264,813 | B2 * | 2/2016 | Riggs | H04R 3/14 |
| 9,749,749 | B2 * | 8/2017 | Harvey | H04R 5/04 |
| 9,924,126 | B2 * | 3/2018 | Masuda | H04S 3/002 |
| 11,115,515 | B2 * | 9/2021 | Liu | H04R 1/025 |
| 2013/0156207 | A1 | 6/2013 | Visser et al. | |

FOREIGN PATENT DOCUMENTS

| | | | |
|---|---|---|---|
| CN | 105074822 | A | 11/2015 |
| CN | 106535076 | A | 3/2017 |
| CN | 107483731 | A | 12/2017 |
| CN | 107888857 | A | 4/2018 |
| CN | 109361797 | A | 2/2019 |
| CN | 111770416 | A | 10/2020 |
| CN | 111787458 | A | 10/2020 |
| CN | 111787478 | A | 10/2020 |

OTHER PUBLICATIONS

Written Opinion of the International Search Authority in International application No. PCT/CN2020/134854, mailed on Aug. 23, 2021.

Chinese Office Action issued in corresponding Chinese Patent Application No. 202011329612.7 dated Apr. 27, 2021, pp. 1-7.

Notification to Grant Patent Right for Invention issued in corresponding Chinese Patent Application No. 202011329612.7 dated Aug. 11, 2021, pp. 1-4.

* cited by examiner

AUDIO PLAYING METHOD AND DEVICE, STORAGE MEDIUM, AND MOBILE TERMINAL

CROSS-REFERENCE TO RELATED APPLICATION

This application is a continuation of International Application No. PCT/CN2020/134854, filed on Dec. 9, 2020, which claims priority to and the benefit of Chinese Patent Application No. 202011329612.7, filed on Nov. 24, 2020. The disclosures of the aforementioned applications are incorporated herein by reference in their entireties.

TECHNICAL FIELD

The present application relates to the field of terminal technologies, and more particularly, to an audio playing method and device, a storage medium, and a mobile terminal.

BACKGROUND

With the development of the terminal technologies, functions of the mobile terminal are more and more abundant, and a multimedia playing function is more and more favored by users as one of the functions of the mobile terminal.

In order to realize the multimedia playing function, a microphone and a speaker are indispensable components in the mobile terminal. Currently, for better audio-visual experience, more and more terminals are designed with change from mono loudspeakers to dual loudspeakers which can provide dual channels. Generally, the dual loudspeakers in most terminals include a main loudspeaker at the bottom of a body and an auxiliary loudspeaker composed of an earphone. This dual loudspeaker structure can effectively provide a stereo feeling for a user. However, since the size and power of a sound-producing element of the earphone itself are less than those of the main loudspeaker, the volume of the dual loudspeakers tends to be a loud sound and a small sound in the process of work of the dual loudspeakers, resulting in a piccolo and bass trumpet phenomenon and a poor stereo playing effect.

SUMMARY

Technical Problems

It is an object of the present application to provide an audio playing method and device, a storage medium, and a mobile terminal, which can improve a piccolo and bass trumpet phenomenon in the dual loudspeaker structure and thus a stereo playing effect.

Technical Solutions

An embodiment of the present application provides an audio playing method applied to a mobile terminal, the mobile terminal including a main speaker and an auxiliary speaker, where the audio playing method includes: when an audio signal to be played is detected, storing the audio signal in a preset buffer while transmitting the audio signal to the auxiliary speaker to enable the auxiliary speaker to play the audio signal; initiating a timer to start timing in a process of storing the audio signal; and when a timing duration for which the timing lasts reaches a preset delay duration, obtaining the audio signal from the preset buffer and transmitting the audio signal to the main speaker to enable the main speaker to play the audio signal.

In an embodiment, the audio playing method further includes: determining a difference value between a first playing volume of the auxiliary speaker and a second playing volume of the main speaker; and determining the preset delay duration according to the difference value.

In an embodiment, the determining the preset delay duration according to the difference value includes: determining a preset difference range corresponding to the difference value; and obtaining a preset duration corresponding to the preset difference range as the preset delay duration.

In an embodiment, the audio playing method further includes: generating a sound effect correcting instruction; displaying a correction interface on a display screen of the mobile terminal according to the sound effect correcting instruction, where the correction interface includes a left channel bar, a right channel bar, a first adjustment block located on the left channel bar, and a second adjustment block located on the right channel bar; obtaining a moving position of at least one of the first adjustment block and the second adjustment block when the at least one of the first adjustment block and the second adjustment block are moved with the correction interface; and updating the preset delay duration according to the moving position.

In an embodiment, the updating the preset delay duration according to the moving position includes: determining a target adjustment ratio according to the moving position; and calculating a product between the target adjustment ratio and the preset delay duration to obtain an updated preset delay duration.

In an embodiment, the generating the sound effect correcting instruction includes: when it is detected that a foreground application page is an audio playing page or a video playing page, generating a dedicated key on the foreground application page; and generating the sound effect correcting instruction when it is detected that the user clicks the dedicated key.

In an embodiment, the preset buffer is a region in a frame layer, a hardware abstraction layer, or a digital signal processing chip in the mobile terminal.

An embodiment of the present application further provides an audio playing device applied to a mobile terminal, the mobile terminal including a main speaker and an auxiliary speaker, where the audio playing device includes: a first transmission circuit for, when an audio signal to be played is detected, storing the audio signal in a preset buffer while transmitting the audio signal to the auxiliary speaker to enable the auxiliary speaker to play the audio signal; a timing circuit for initiating a timer to start timing in a process of storing the audio signal; and a second transmission circuit for, when a timing duration for which the timing lasts reaches a preset delay duration, obtaining the audio signal from the preset buffer and transmitting the audio signal to the main speaker to enable the main speaker to play the audio signal.

In an embodiment, the audio playing device further includes a first determination circuit for: determining a difference value between a first playing volume of the auxiliary speaker and a second playing volume of the main speaker; and determining the preset delay duration according to the difference value.

In an embodiment, the first determination circuit is specifically configured for: determining a preset difference range corresponding to the difference value; and obtaining a preset duration corresponding to the preset difference range as the preset delay duration.

In an embodiment, the audio playing device further includes a second determination circuit for: generating a sound effect correcting instruction; displaying a correction interface on a display screen of the mobile terminal according to the sound effect correcting instruction, where the correction interface includes a left channel bar, a right channel bar, a first adjustment block located on the left channel bar, and a second adjustment block located on the right channel bar; obtaining a moving position of at least one of the first adjustment block and the second adjustment block when the at least one of the first adjustment block and the second adjustment block are moved with the correction interface; and updating the preset delay duration according to the moving position.

In an embodiment, the second determination circuit is specifically configured for: determining a target adjustment ratio according to the moving position; and calculating a product between the target adjustment ratio and the preset delay duration to obtain an updated preset delay duration.

In an embodiment, the second determination circuit is specifically configured for: when it is detected that a foreground application page is an audio playing page or a video playing page, generating a dedicated key on the foreground application page; and generating the sound effect correcting instruction when it is detected that the user clicks the dedicated key.

In an embodiment, the preset buffer is a region in a frame layer, a hardware abstraction layer, or a digital signal processing chip in the mobile terminal.

An embodiment of the present application further provides a computer-readable storage medium in which a plurality of instructions are stored, where the instructions are adapted to be loaded by a processor to perform any of the audio playing methods described above.

An embodiment of the present application further provides a mobile terminal, including: a memory, a processor, and a computer program stored on the memory and operable on the processor, where the computer program, when executed by the processor, implements steps of any of the audio playing methods described above.

BENEFICIAL EFFECTS

According to the audio playing method and device, the storage medium, and the mobile terminal provided in the present application, the audio playing method and device are applied to the mobile terminal including the main speaker and the auxiliary speaker. When the audio signal to be played is detected, the audio signal is stored in the preset buffer, while the audio signal is transmitted to the auxiliary speaker so that the auxiliary speaker plays the audio signal. Then, in the process of storing the audio signal, a timer is initiated to start timing, and when the timing duration for which the timing lasts reaches the preset delay duration, the audio signal is obtained from the preset buffer and transmitted to the main speaker so that the main speaker plays the audio signal. As such, the piccolo and bass trumpet phenomenon in the dual speaker structure can be improved by delaying the playing of the main speaker, thereby improving the stereo playing effect. Further, the audio playing method and device is completely realized on the basis of software without adding hardware, so the audio playing method and device has high flexibility, and cost of the mobile terminal can be reduced.

BRIEF DESCRIPTION OF THE DRAWINGS

Technical solutions and other beneficial effects of the present disclosure are apparent below from detailed description of the embodiments of the present disclosure in combination with the accompanying drawings.

EMBODIMENTS OF THE PRESENT DISCLOSURE

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

Embodiments of the present application provide an audio playing method and device, a storage medium, and a mobile terminal.

Figure 1:
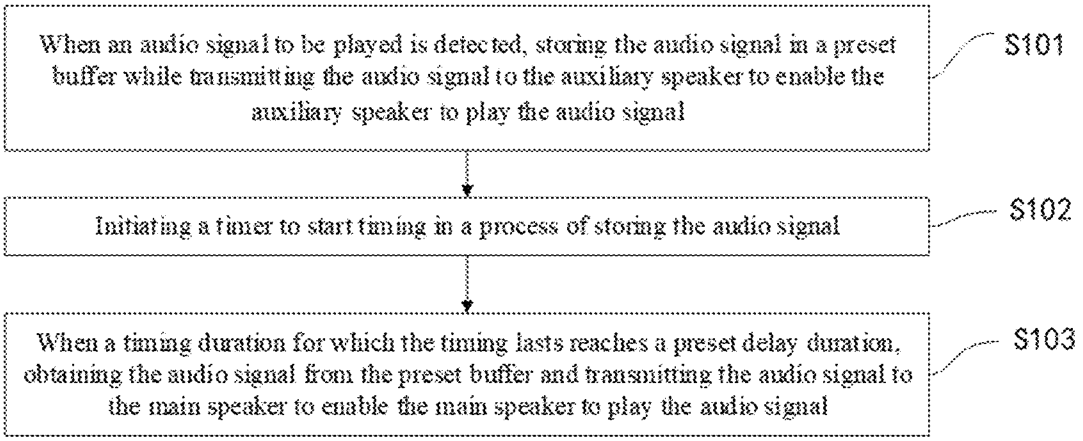
FIG. 1 is a flow diagram of an audio playing method according to an embodiment of the present application.

As shown in FIG. 1, which is a flow diagram of an audio playing method according to an embodiment of the present application. The audio playing method is applied to a mobile terminal. The mobile terminal includes a main speaker and an auxiliary speaker. The mobile terminal may be a device such as a smartphone, a tablet computer, and an IPAD. The detailed flows of the audio playing method may be as follows.

S101 of, when an audio signal to be played is detected, storing the audio signal in a preset buffer while transmitting the audio signal to the auxiliary speaker to enable the auxiliary speaker to play the audio signal.

Figure 2:
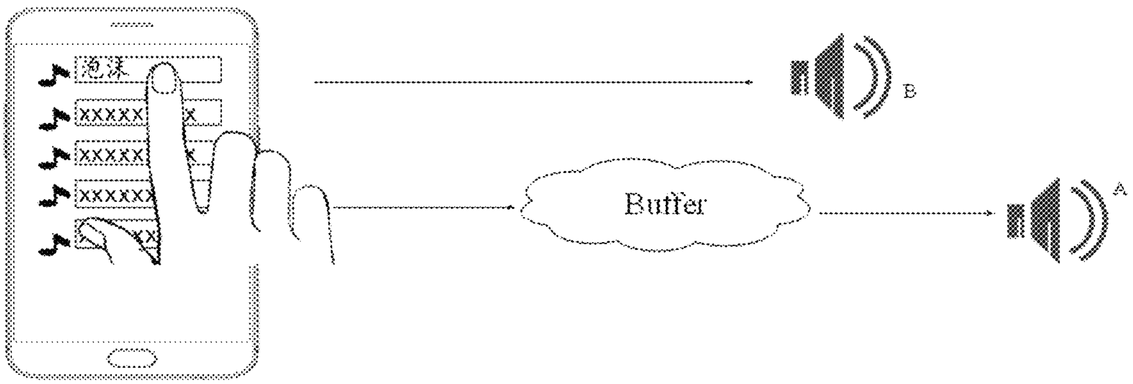
FIG. 2 is an illustration diagram of an audio playing flow according to an embodiment of the present application.

The preset buffer may be any region available for data storage in the mobile terminal, for example, any region in a Framework (frame) layer, a Hardware Abstraction Layer (HAL), or a digital signal processing chip (ADSP). The audio signal to be played may be a song, an audio in a video, a voice in a chat software, or the like. For example, referring to FIG. 2, when a user turns on a music playing application and clicks a playing button of the song "foam", the song "foam" may be used as the audio signal to be played. In this case, the audio signal may be simultaneously transmitted along two lines. One line is that the audio signal is transmitted to the preset buffer, via which the audio signal is transmitted to a main speaker A for playing the audio signal, and the other line is that the audio signal is directly transmitted to the auxiliary speaker B for playing the audio signal.

S102 of initiating a timer to start timing in a process of storing the audio signal.

Since the audio signal is usually a segment of signal stream, the storage operation of the audio signal in the preset buffer needs a certain time, and the mobile terminal may perform the storage operation of the audio signal while performing timing.

S103 of, when a timing duration for which the timing lasts reaches a preset delay duration, obtaining the audio signal from the preset buffer and transmitting the audio signal to the main speaker to enable the main speaker to play the audio signal.

It should be noted that the larger the volume difference between the main loudspeaker and the auxiliary loudspeaker is, the longer the preset delay duration can be, in order to obtain a better stereo sound effect, which is mainly designed based on the human perception principle of sound localization. In particular, an important factor of the human perceiving a sound position is a difference between a sound heard by a right ear and a sound heard by a left ear, which can be caused by an inter-ear level difference and an inter-ear time difference, where the inter-ear level difference refers to a difference in the volume of the sounds heard by the two ears and perceived by the user, and the inter-ear time difference refers to the time difference between the sounds perceived by the user reaching the two ears. For example, a gunshot is propagated from the right of a user and first reaches the right ear of the user and then the left ear because the sound is propagated in the form of an acoustic wave, so the inter-ear time difference may enable the user to perceive the gunshot to be propagated from the right of the user. In addition, due to the natural dissipation of the sound wave and the absorption and reflection of the sound by the human head, the sound reaching the left ear is weaker than that reaching the right ear, so the inter-ear level difference may enable the user to perceive the gunshot to be propagated from the right of the user. Based on the above-mentioned perception principle, the problem that the difference in the left and right sound volumes due to the structural difference in the dual loudspeakers may cause the user's ear to seemingly deviated to a certain loudspeaker can be overcome.

The preset delay duration is set manually, for example, 20 ms, and it is generally recommended that the delay duration is not greater than 25 ms, so that a user can perceive a delay effect due to too long duration. The preset delay duration is generally designed based on objective factors influencing the volume of the sounds, such as the size and power of sound generating elements of the main loudspeaker and the auxiliary loudspeaker, and the structure of a sound cavity.

For example, the audio playing method may further include: determining a difference value between a first playing volume of the auxiliary speaker and a second playing volume of the main speaker; and determining the preset delay duration according to the difference value.

The preset delay duration may be calculated. A developer may design a calculation formula of the volume difference based on the size and power of the sound generating elements of the loudspeaker in advance. The parameters in the calculation formula may be adaptively adjusted according to the change of the size and power. If the loudspeaker fails and needs to be replaced subsequently, the terminal may detect the size and power of the replaced loudspeaker (for example, the power is determined by a coil current of the loudspeaker) to update the volume difference. The preset delay duration may be directly proportional to the volume difference.

In other embodiments, the preset delay duration may be a fixed value set in advance. In this case, the step of "determining the preset delay duration according to the difference value" may specifically include: determining a preset difference range corresponding to the difference value; and obtaining a preset duration corresponding to the preset difference range as the preset delay duration.

The developer can set a plurality of preset difference ranges and a preset duration corresponding to each of the preset difference ranges in advance in the mobile terminal, and associates each of the preset difference ranges with the preset duration corresponding to the preset different range and stores them. In an actual application, the preset difference range corresponding to the volume difference of the main speaker and the auxiliary speaker of the current mobile terminal can be directly found, and thus the preset duration can be correspondingly determined based on the preset difference range as the preset delay duration.

Figure 3:
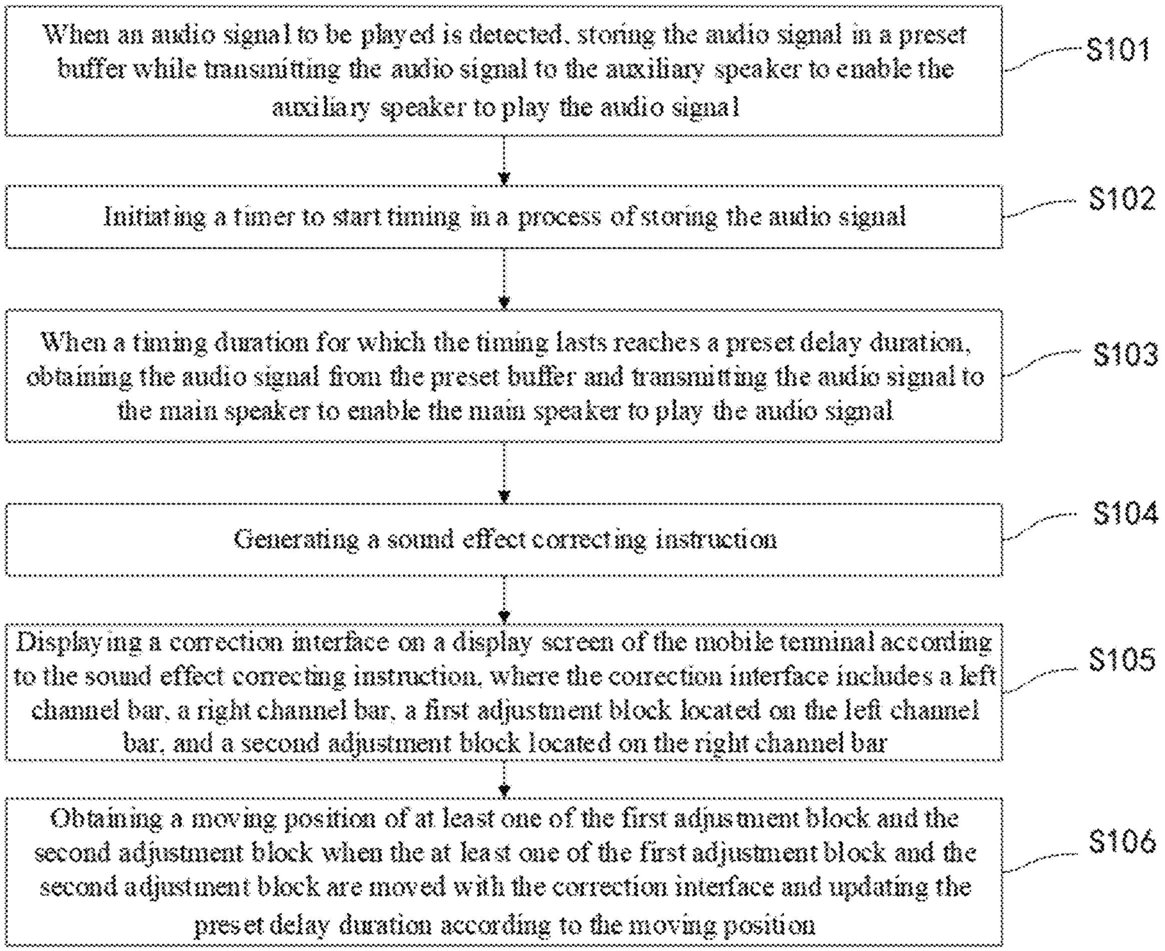
FIG. 3 is another flow diagram of an audio playing method according to an embodiment of the present application.

In addition to adjusting the preset delay duration by the terminal itself, the user may adjust the preset delay duration. For example, when the user obviously perceived that the volumes of the left and right ears are not balanced, the user may actively trigger adjustment of the preset delay duration. That is, referring to FIG. 3, the audio playing method may further include following steps S104-S106.

S104 of generating a sound effect correcting instruction.

Specifically, a dedicated key may be generated on the display interface to provide a sound effect correcting function for the user. The terminal may trigger generation of the dedicated key when an audio playing page or a video playing page is displayed on a current foreground, and generating the sound effect correcting instruction when the user clicks the dedicated key.

S105 of displaying a correction interface on a display screen of the mobile terminal according to the sound effect correcting instruction, where the correction interface includes a left channel bar, a right channel bar, a first adjustment block located on the left channel bar, and a second adjustment block located on the right channel bar.

Figure 4:
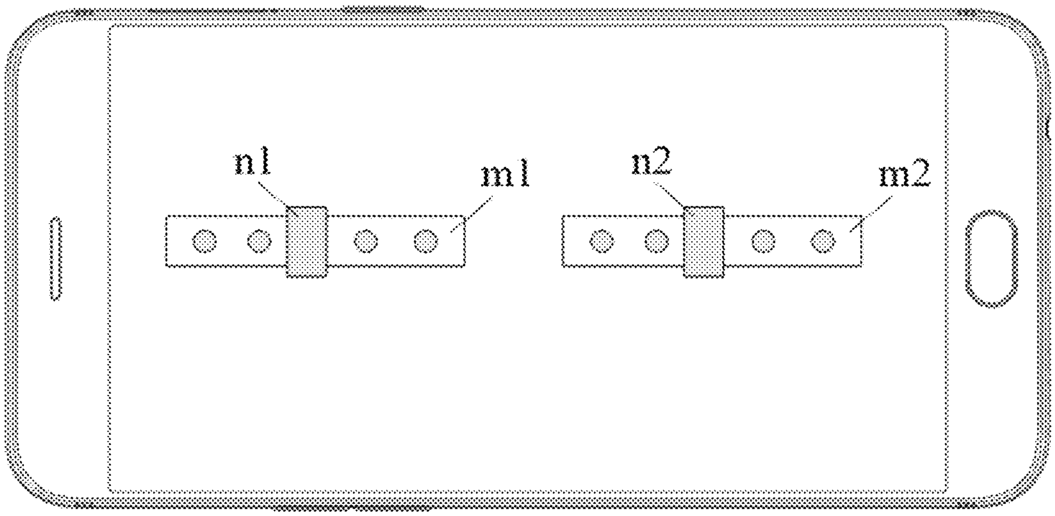
FIG. 4 is an illustration diagram of a calibration interface according to an embodiment of the present application.

Referring to FIG. 4, a left channel bar m1 and a right channel bar m2 may be long bar shapes, have a plurality of nodes or scales, and correspond to the auxiliary loudspeaker and the main loudspeaker, respectively. Generally, adjustment blocks (n1 and n2) displayed for the first time are located at a midpoint position of the nodes or scales. When the user moves the adjustment block to the left, it may be considered that the user wants to decrease the volume of the corresponding channel. When the user moves the adjustment block to the right, it may be considered that the user wants to increase the volume of the corresponding channel. The larger the moving amplitude of the adjustment block is, and the larger the volume adjustment amplitude of the corresponding channel is. The adjustment block may be of any shape, such as square or circular, etc.

S106 of obtaining a moving position of at least one of the first adjustment block and the second adjustment block when the at least one of the first adjustment block and the second adjustment block are moved with the correction interface and updating the preset delay duration according to the moving position.

The above step of "updating the preset delay duration according to the moving position" specifically includes: determining a target adjustment ratio according to the moving position; and calculating a product between the target adjustment ratio and the preset delay duration to obtain an updated preset delay duration.

Specifically, it can be considered that the ratio of the final positions of the first adjustment block and the second adjustment block on the respective channel bars after the adjustment blocks are moved is the target adjustment ratio. For example, in the case of an ideal stereo sound effect, both the first adjustment block and the second adjustment block should be located at the intermediate node, that is, the ratio is 1. When at least one of the first adjustment block and the second adjustment block is moved, the ratio may be less than 1 or greater than 1. The ratio being less than 1 indicates that the volume of the main speaker needs to be increased, that is, the preset delay duration is decreased. The ratio being greater than 1 indicates that the volume of the main speaker needs to be decreased, that is, the preset delay duration is increased.

It can be known from above that, according to the audio playing method provided in the present application, the audio playing method are applied to the mobile terminal including the main speaker and the auxiliary speaker. When the audio signal to be played is detected, the audio signal is stored in the preset buffer, while the audio signal is transmitted to the auxiliary speaker so that the auxiliary speaker plays the audio signal. Then, in the process of storing the audio signal, a timer is initiated to start timing, and when the timing duration for which the timing lasts reaches the preset delay duration, the audio signal is obtained from the preset buffer and transmitted to the main speaker so that the main speaker plays the audio signal. As such, the piccolo and bass trumpet phenomenon in the dual speaker structure can be improved by delaying the playing of the main speaker, thereby improving the stereo playing effect. Further, the audio playing method and device is completely realized on the basis of software without adding hardware, so the audio playing method and device has high flexibility, and cost of the mobile terminal can be reduced.

Figure 5:
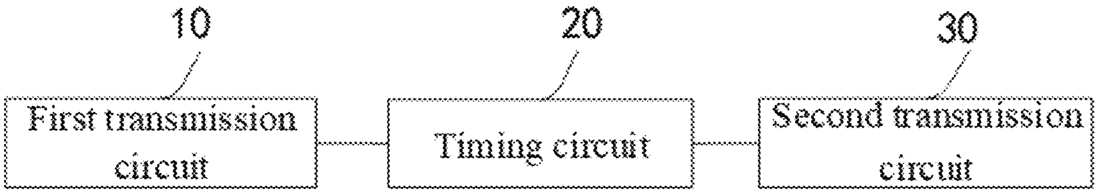
FIG. 5 is a schematic structural view of an audio playing device according to an embodiment of the present application.

On the basis of the above embodiment, the present embodiment will be further described from the perspective of an audio playing device. Referring to FIG. 5, which specifically describes an audio playing device provided in an embodiment of the present application. The audio playing device is applied to a mobile terminal including a main speaker and an auxiliary speaker. The audio playing device may include a first transmission circuit 10, a timing circuit 20, and a second transmission circuit 30.

The first transmission circuit 10 may be configured for, when an audio signal to be played is detected, storing the audio signal in a preset buffer while transmitting the audio signal to the auxiliary speaker to enable the auxiliary speaker to play the audio signal.

The preset buffer may be any region available for data storage in the mobile terminal, for example, any region in a Framework (frame) layer, a Hardware Abstraction Layer (HAL), or a digital signal processing chip (ADSP). The audio signal to be played may be a song, an audio in a video, a voice in a chat software, or the like. For example, referring to FIG. 2, when a user turns on a music playing application and clicks a playing button of the song "foam", the song "foam" may be used as the audio signal to be played. In this case, the audio signal may be simultaneously transmitted along two lines. One line is that the audio signal is transmitted to the preset buffer, via which the audio signal is transmitted to a main speaker A for playing, and the other line is that the audio signal is directly transmitted to the auxiliary speaker B for playing.

The timing circuit 20 may be configured for initiating a timer to start timing in a process of storing the audio signal.

Since the audio signal is usually a segment of signal stream, the storage operation of the audio signal in the preset buffer needs a certain time, and the mobile terminal may perform the storage operation of the audio signal while performing timing.

The second transmission circuit 30 may be configured for, when a timing duration for which the timing lasts reaches a preset delay duration, obtaining the audio signal from the preset buffer and transmitting the audio signal to the main speaker to enable the main speaker to play the audio signal.

It should be noted that the larger the volume difference between the main loudspeaker and the auxiliary loudspeaker is, the longer the preset delay duration can be, in order to obtain a better stereo sound effect, which is mainly designed based on the human perception principle of sound localization. In particular, an important factor of the human perceiving a sound position is a difference between a sound heard by a right ear and a sound heard by a left ear, which can be caused by an inter-ear level difference and an inter-ear time difference, where the inter-ear level difference refers to a difference in the volume of the sounds heard by the two ears and perceived by the user, and the inter-ear time difference refers to the time difference between the sounds perceived by the user reaching the two ears. For example, a gunshot is propagated from the right of a user and first reaches the right ear of the user and then the left ear because the sound is propagated in the form of an acoustic wave, so the inter-ear time difference may enable the user to perceive the gunshot to be propagated from the right of the user. In addition, due to the natural dissipation of the sound wave and the absorption and reflection of the sound by the human head, the sound reaching the left ear is weaker than that reaching the right ear, so the inter-ear level difference may enable the user to perceive the gunshot to be propagated from the right of the user. Based on the above-mentioned perception principle, the problem that the difference in the left and right sound volumes due to the structural difference in the dual loudspeakers may cause the user's ear to seemingly deviated to a certain loudspeaker can be overcome.

Figure 6:
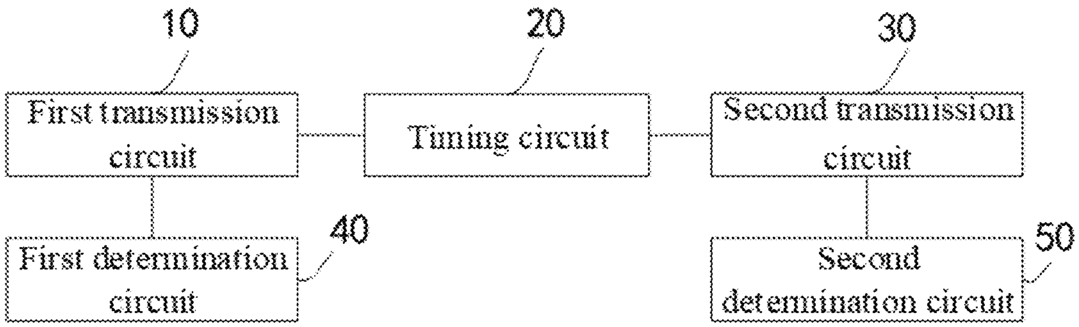
FIG. 6 is another schematic structural view of an audio playing device according to an embodiment of the present application.

The preset delay duration is set manually, for example, 20 ms, and it is generally recommended that the delay duration is not greater than 25 ms, so that a user can perceive a delay effect due to too long duration. The preset delay duration is generally designed based on objective factors influencing the volume of the sounds, such as the size and power of sound generating elements of the main loudspeaker and the auxiliary loudspeaker, and the structure of a sound cavity. For example, referring to FIG. 6, the audio playing device further includes a first determination circuit 40 for: determining a difference value between a first playing volume of the auxiliary speaker and a second playing volume of the main speaker; and determining the preset delay duration according to the difference value.

The preset delay duration may be calculated. A developer may design a calculation formula of the volume difference based on the size and power of the sound generating elements of the loudspeaker in advance. The parameters in the calculation formula may be adaptively adjusted according to the change of the size and power. If the loudspeaker fails and needs to be replaced subsequently, the terminal may detect the size and power of the replaced loudspeaker (for example, the power is determined by a coil current of the loudspeaker) to update the volume difference. The preset delay duration may be directly proportional to the volume difference.

In other embodiments, the preset delay duration may be a fixed value set in advance. In this case, in performing the above step of "determining the preset delay duration according to the difference value", the first determination circuit 40 may be specifically configured for: determining a preset difference range corresponding to the difference value; and obtaining a preset duration corresponding to the preset difference range as the preset delay duration.

The developer can set a plurality of preset difference ranges and a preset duration corresponding to each of the preset difference ranges in advance in the mobile terminal, and associates each of the preset difference ranges with the preset duration corresponding to the preset different range and stores them. In an actual application, the preset difference range corresponding to the volume difference of the main speaker and the auxiliary speaker of the current mobile terminal can be directly found, and thus the preset duration can be correspondingly determined based on the preset difference range as the preset delay duration.

In addition to adjusting the preset delay duration by the terminal itself, the user may adjust the preset delay duration. For example, when the user obviously perceived that the volumes of the left and right ears are not balanced, the user may actively trigger adjustment of the preset delay duration. That is, the audio playing device may further include a second determination circuit 50 for performing following steps S104-S106.

S104 of generating a sound effect correcting instruction.

Specifically, a dedicated key may be generated on the display interface to provide a sound effect correcting function for the user. The terminal may trigger generation of the dedicated key when an audio playing page or a video playing page is displayed on a current foreground, and generating the sound effect correcting instruction when the user clicks the dedicated key.

S105 of displaying a correction interface on a display screen of the mobile terminal according to the sound effect correcting instruction, where the correction interface includes a left channel bar, a right channel bar, a first adjustment block located on the left channel bar, and a second adjustment block located on the right channel bar.

Referring to FIG. 4, a left channel bar and a right channel bar may be long bar shapes, have a plurality of nodes or scales, and correspond to the auxiliary loudspeaker and the main loudspeaker, respectively. Generally, adjustment blocks displayed for the first time are located at a midpoint position of the nodes or scales. When the user moves the adjustment block to the left, it may be considered that the user wants to decrease the volume of the corresponding channel. When the user moves the adjustment block to the right, it may be considered that the user wants to increase the volume of the corresponding channel. The larger the moving amplitude of the adjustment block is, and the larger the volume adjustment amplitude of the corresponding channel is. The adjustment block may be of any shape, such as square or circular, etc.

S106 of obtaining a moving position of at least one of the first adjustment block and the second adjustment block when the at least one of the first adjustment block and the second adjustment block are moved with the correction interface and updating the preset delay duration according to the moving position.

The second determination circuit 20 is specifically configured for: determining a target adjustment ratio according to the moving position; and calculating a product between the target adjustment ratio and the preset delay duration to obtain an updated preset delay duration.

Specifically, it can be considered that the ratio of the final positions of the first adjustment block and the second adjustment block on the respective channel bars after the adjustment blocks are moved is the target adjustment ratio. For example, in the case of an ideal stereo sound effect, both the first adjustment block and the second adjustment block should be located at the intermediate node, that is, the ratio is 1. When at least one of the first adjustment block and the second adjustment block is moved, the ratio may be less than 1 or greater than 1. The ratio being less than 1 indicates that the volume of the main speaker needs to be increased, that is, the preset delay duration is decreased. The ratio being greater than 1 indicates that the volume of the main speaker needs to be decreased, that is, the preset delay duration is increased.

In the specific implementation, each of the above circuits may be implemented as an independent entity, or may be implemented in any combination as the same entity or several entities. For the specific implementation of each of the above circuits, reference may be made to the foregoing method embodiments, and details thereof are not repeatedly described herein.

It can be known from above that, according to the audio playing device provided in the present application, the audio playing device are applied to the mobile terminal including the main speaker and the auxiliary speaker. When the audio signal to be played is detected, the first transmission circuit is configured for storing the audio signal in the preset buffer, while transmitting the audio signal to the auxiliary speaker so that the auxiliary speaker plays the audio signal. Then, in the process of storing the audio signal, the timing circuit 20 initiates the timer to start timing, and when the timing duration for which the timing lasts reaches the preset delay duration, the second transmission circuit 30 obtains the audio signal from the preset buffer and transmitted the audio signal to the main speaker so that the main speaker plays the audio signal. As such, the piccolo and bass trumpet phenomenon in the dual speaker structure can be improved by delaying the playing of the main speaker, thereby improving the stereo playing effect. Further, the audio playing method and device is completely realized on the basis of software without adding hardware, so the audio playing method and device has high flexibility, and cost of the mobile terminal can be reduced.

Accordingly, an embodiment of the present invention further provides an audio playing system including any of the audio playing devices provided in embodiments of the present application, which may be integrated in a mobile terminal.

When an audio signal to be played is detected, the mobile terminal stores the audio signal in a preset buffer while transmitting the audio signal to the auxiliary speaker to enable the auxiliary speaker to play the audio signal. A timer is initiated to start timing in a process of storing the audio signal. When a timing duration for which the timing lasts reaches a preset delay duration, the audio signal is obtained from the preset buffer and transmitted to the main speaker to enable the main speaker to play the audio signal.

Implementation of each of the foregoing devices may refer to above embodiments, and is not repeated herein.

Since the audio playing system may include any one of the audio playing devices provided in the embodiments of the present application, it can realize the beneficial effects achieved by any one of the audio playing devices provided in the embodiments of the present application, which are referred to above embodiments and are not repeated herein.

In addition, an embodiment of the present application further provides a terminal device. The terminal device may be a device such as a smartphone or an intelligent vehicle.

Figure 7:
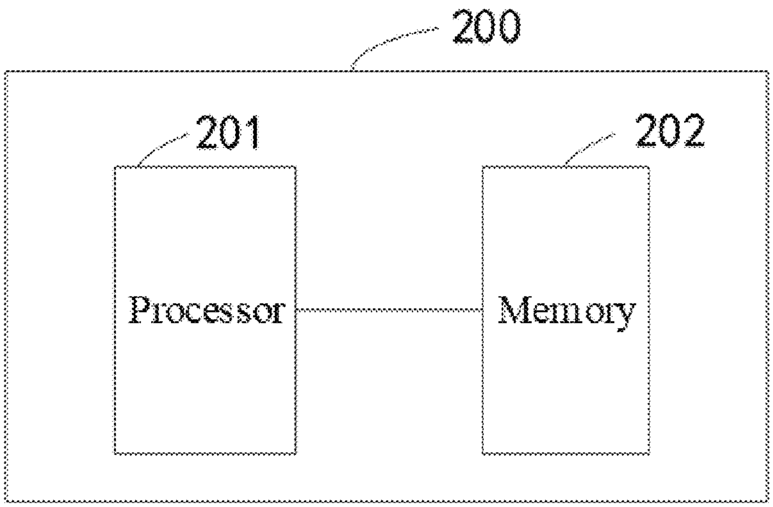
FIG. 7 is a schematic structural diagram of a mobile terminal according to an embodiment of the present application.

As shown in FIG. 7, the mobile terminal 200 includes a processor 201 and a memory 202. The processor 201 and the memory 202 are electrically connected to each other.

The processor 201 is a control center of the mobile terminal 200, is connected with all the parts of the whole mobile terminal by various interfaces and lines, and is configured to execute various functions of the mobile terminal and process the data by operating or loading application programs stored in the memory 202 and calling data stored in the memory 202, so as to carry out integral monitoring on the mobile terminal.

In the present embodiment, the processor 201 in the mobile terminal 200 loads instructions corresponding to processes of one or more application programs into the memory 202 and then executes the application programs stored in the memory 202 to implement various functions according to the following steps: when an audio signal to be played is detected, storing the audio signal in a preset buffer while transmitting the audio signal to the auxiliary speaker to enable the auxiliary speaker to play the audio signal; initiating a timer to start timing in a process of storing the audio signal; and when a timing duration for which the timing lasts reaches a preset delay duration, obtaining the audio signal from the preset buffer and transmitting the audio signal to the main speaker to enable the main speaker to play the audio signal.

Figure 8:
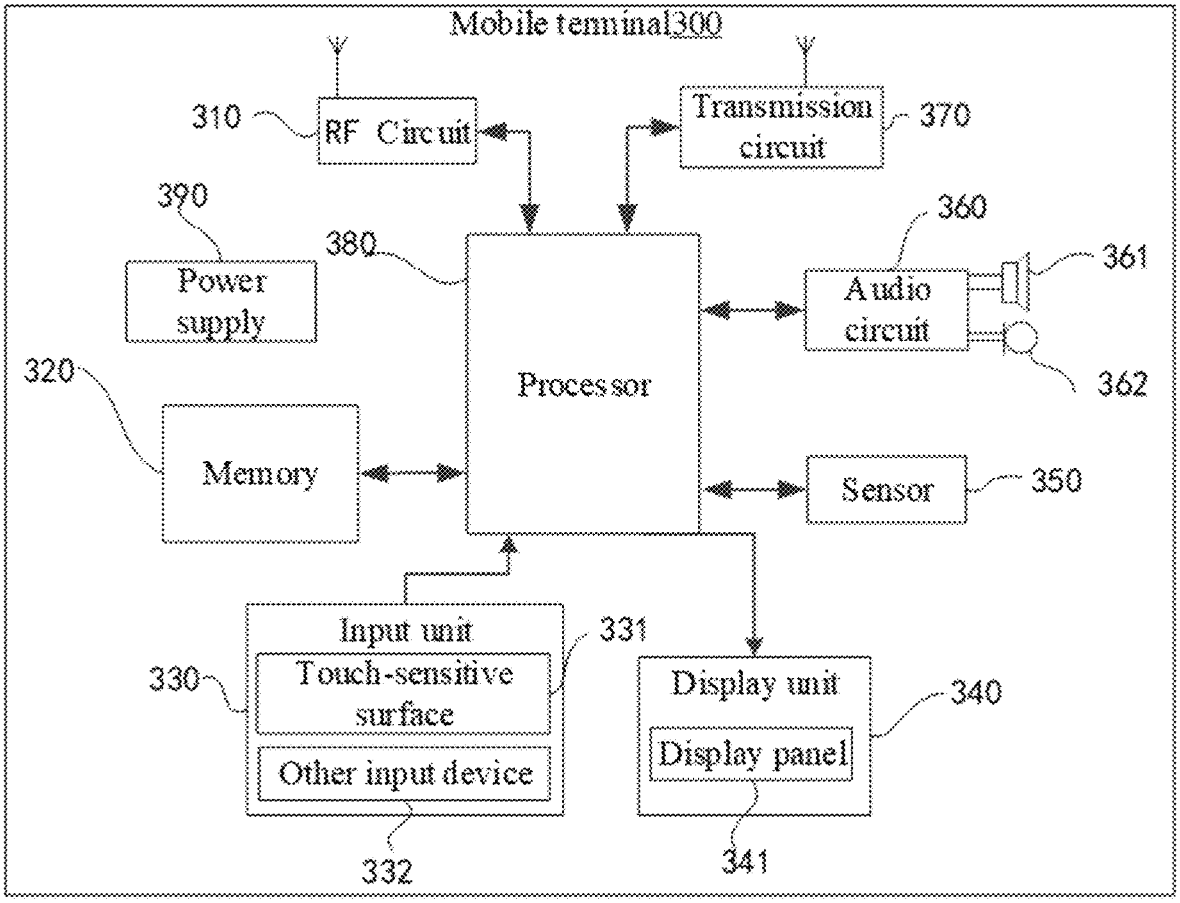
FIG. 8 is another schematic structural diagram of a mobile terminal according to an embodiment of the present application.

FIG. 8 illustrates a structural schematic diagram of a mobile terminal provided by an embodiment of the present application. The mobile terminal can be used for implementing the audio playing method provided in any one of the above-mentioned embodiments. The mobile terminal 300 may be a smartphone or a tablet computer.

An RF circuit 310 is configured to receive and transmit electromagnetic waves and to realize conversions of the electromagnetic waves and electrical signals, thereby communicating with a communication network or any other device. The RF circuit 310 can include various conventional circuit elements used for performing these functions, for example, an antenna, a radio frequency transmitter, a digital signal processor, an encryption/decryption chip, a subscriber identification module (SIM) card, a memory and the like. The RF circuit 310 can communicate with various networks, for example, an internet, an intranet or a wireless network, or can communicate with any other device via a wireless network. The above-mentioned wireless network can include a cellular telephone network, a wireless local area network or a metropolitan area network. The above-mentioned wireless network can use various communication standards, protocols and technologies and can include but not limited to, Global System of Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi, for example, Institute of Electrical and Electronics Engineers (IEEE) 802.11a, IEEE 802.11b, IEEE 802.11g and/or IEEE 802.11n), Voice over Internet Protocol (VoIP), Worldwide Interoperability for Microwave Access (Wi-Max), other protocols for E-mail, instant messaging and Short Messaging Service and other suitable communication protocols, and can include protocols which are not developed currently.

A memory 320 can be configured to store software programs and modules, such as the program instructions/modules corresponding to the front-camera-captured automatic light compensation method and system in above-mentioned embodiments. The processor 380 can perform various applications of functions and data processing by executing the software programs and modules stored in the memory 320 to implement the function of front-camera-captured automatic light compensation. The memory 320 can include a high speed random access memory and also can include a non-volatile memory, such as one or more disk storage devices, a flash memory device or other non-volatile solid storage devices. In some embodiments, the memory 320 can further include a remote memory disposed corresponding to the processor 380. The remote memory can be connected to the mobile terminal 300 via a network. Examples of the network include but are not limited to an internet, an intranet, a local area network, a mobile communication network and the combinations of them.

An input unit 330 can be configured to receive input number or character information and to generate keyboard, mouse, joystick, optical or trajectory ball signal inputs related to a user's setting and functional control. In detail, the input unit 330 can include a touch-sensitive surface 331 and other input devices 332. The touch-sensitive surface 331, also called a touch display screen or a touch panel, can be configured to detect touch operations of a user on or near the touch-sensitive surface 331 (for example, operations carried out by the user through any suitable objects or attachments, such as a finger, a touch pen and the like, on the touch-sensitive surface 331 or near the touch-sensitive surface 331) and to drive a corresponding device connected therewith according to a preset program. Optionally, the touch-sensitive surface 731 can include a touch detection device and a touch controller. The touch detection device detects the touch direction of the user, detects a signal caused by the touch operation, and transmits the signal to the touch controller. The touch controller receives touch information from the touch detection device, converts the touch information into a contact coordinate, and then transmits the contact coordinate to the processor 380 and can receive a command transmitted by the processor 380 and execute the command. Moreover, the touch-sensitive surface 331 can be one of various types, such as a resistance type, a capacitance type, an infrared type, a surface acoustic wave type and the like. Besides the touch-sensitive surface 331, the input unit 330 also can include the other input devices 332. In detail, other input devices 332 can include, but is not limited to, one or more of a physical keyboard, function keys (such as a volume control key, a switching key and the like), a trackball, a mouse, a joystick and the like.

A display unit 340 can be configured to display information input by the user or information provided for the user and various graphical user interfaces of the mobile terminal 300. The graphical user interfaces can be constituted by graphics, texts, icons, videos and any combinations of them. The display unit 340 can include a display panel 341. Optionally, the display panel 341 can be configured in forms of a Liquid Crystal Display (LCD), an Organic Light-Emitting Diode (OLED) and the like. Furthermore, the touch panel 331 can cover the display panel 341. When the touch-sensitive surface 331 detects a touch operation on or near it, the signal caused by the touch operation is transmitted to the processor 380 to determine the type of a touch event. Then, the processor 380 provides a corresponding visual output on the display panel 341 according to the type of the touch event. Although the touch-sensitive surface 331 and the display panel 341 in FIG. 8 are served as two independent parts for accomplishing input and output functions, it can be understood that the touch-sensitive surface 331 and the display panel 341 can be integrated to accomplish the input and output functions.

The mobile terminal 300 can further include at least one sensor 350, such as an optical sensor, a motion sensor and other sensors. In detail, the optical sensor can include an environmental light sensor and a proximity sensor. The environmental light sensor can adjust brightness of the display panel 341 according to the lightness of environmental light. The proximity sensor can turn off the display panel 341 and/or the backlight when the terminal device 300 is moved close to ears. As one type of the motion sensor, a gravity accelerometer sensor can detect the value of an acceleration in each direction (generally in three axial directions), can detect the value and the direction of gravity in a static state, and can identify a gesture in a cell phone application (such as a screen switch between landscape style and portrait style, relevant games, and magnetometer calibration) and recognize vibration patterns to identify relevant functions (such as pedometer, and knock), and so on. Additionally, a gyroscope, a barometer, a hygrometer, a thermometer, an infrared sensor, and any other sensor can be deployed in the terminal device 300, and the details for these are not repeated herein.

The audio circuit 360, a speaker 361, and a microphone 362 can provide an audio interface between the user and the terminal device 300. The audio circuit 360 converts received audio data to an electrical signal and transmits the electrical signal to the speaker 361. The speaker 361 converts the electrical signal to sound signals and outputs the sound signals. In addition, the microphone 362 converts collected sound signal to an electrical signal. The audio circuit 360 converts the electrical signal to audio data and transmits the audio data to the processor 380 for further processing. After the processing, the audio data may be transmitted to another terminal via the RF circuit 310, or transmitted to the memory 320 for further processing. The audio circuit 360 may further include an earphone jack for providing communication between an external earphone and the terminal device 300.

The terminal device 300 can be configured to, by the transmission circuit 370 (such as a WI-FI circuit), send and receive emails, browse a web-page, and access to streaming media, and so on. It provides the user with wireless broadband internet access. It should be understood that although the transmission circuit 370 is illustrated in FIG. 8, this circuit is not an essential component for the terminal device 300 and can be omitted according to needs without departing from the scope of the present invention.

The processor 380 functions as a control center of the terminal device 300 and is configured to connect each component of the cell phone using various interfaces and circuits, and is configured to execute the various functions of the terminal device 300 and to perform data processing by running or executing the software programs and/or modules stored in the memory 320 and calling the data stored in the memory 320, thereby monitoring the overall cell phone. Optionally, the processor 380 can include one or more processing cores. In some embodiments, an application processor and a modulation/demodulation processor can be integrated to form the processor 380. The application processor is primarily configured to process an operating system, user interfaces, application programs, and so on. The modulation/demodulation processor is primarily configured to process wireless communication. It should be understood that the modulation/demodulation processor can be independent from the processor 380.

The terminal device 300 further includes the power supply 390 (such as a battery) configured to provide power for the various components of the terminal device 300. In some embodiments, the power supply can be logically coupled to the processor 380 via a power management system that controls charging, discharging, power consumption, and so on. The power supply 190 may further include one or more direct current (DC)/or alternating current (AC) power sources, recharging system, power failure detection circuit, power converter or inverter, power supply status indicator, and the like.

Although not being shown, the terminal device 300 may include a camera (such as a front camera and a rear camera), a BLUETOOTH circuit, and so on, which are not repeated herein. In the present embodiment, a display unit of the mobile terminal is a display with a touch screen. The terminal device further includes a memory and one or more programs. The one or more programs are stored in the memory. After configuration, one or more processors execute the one or more programs, which include the following operating instructions: when an audio signal to be played is detected, storing the audio signal in a preset buffer while transmitting the audio signal to the auxiliary speaker to enable the auxiliary speaker to play the audio signal; initiating a timer to start timing in a process of storing the audio signal; and when a timing duration for which the timing lasts reaches a preset delay duration, obtaining the audio signal from the preset buffer and transmitting the audio signal to the main speaker to enable the main speaker to play the audio signal.

In the specific implementation, each of the above circuits may be implemented as an independent entity, or may be implemented in any combination as the same entity or several entities. For the specific implementation of each of the above circuits, reference may be made to the foregoing method embodiments, and details thereof are not repeatedly described herein.

A person of ordinary skill in the art may understand that all or some of the steps in various methods of the foregoing embodiments may be implemented by program instructions, or may be implemented by a program instructing relevant hardware. The program instructions may be stored in a computer readable storage medium, and be loaded and executed by a processor. For this, an embodiment of the present application provides a storage medium, which stores a plurality of instructions that can be loaded by the processor to execute the steps of any of the audio playing methods provided in the embodiments of the present application.

The storage medium may include a Read Only Memory (ROM), a Random Access Memory (RAM), a magnetic disk, an optical disk, or the like.

Since the program instructions stored in the storage medium can execute the steps of any of the audio playing methods provided in the embodiments of the present application, it can realize the beneficial effects achieved by any of the audio playing methods provided in the embodiments of the present application, which are referred to above embodiments and are not repeated herein.

Implementation of above operations may refer to above embodiments, and is not repeated herein.

In summary, although preferred embodiments have been described above in the present application, the above-mentioned preferred embodiments are not intended to limit the present application. Those of ordinary skilled in the art can make various modifications and changes without departing from the spirit and scope of the present application. Therefore, the protection scope of the present application is subject to the scope defined by the claims.

What is claimed is:

1. An audio playing method applied to a mobile terminal, the mobile terminal comprising a main speaker and an auxiliary speaker, wherein the audio playing method comprises:

in response to detecting an audio signal to be played, storing the audio signal in a preset buffer while transmitting the audio signal to the auxiliary speaker to enable the auxiliary speaker to play the audio signal;

initiating a timer to start timing in a process of storing the audio signal;

in response to a timing duration for which the timing lasts reaching a preset delay duration, obtaining the audio signal from the preset buffer and transmitting the obtained audio signal to the main speaker to enable the main speaker to play the audio signal;

generating a sound effect correcting instruction;

displaying a correction interface on a display screen of the mobile terminal based on the sound effect correcting instruction, wherein the correction interface comprises a left channel bar, a right channel bar, a first adjustment block located on the left channel bar, and a second adjustment block located on the right channel bar;

obtaining a moving position of at least one of the first adjustment block and the second adjustment block when the at least one of the first adjustment block and the second adjustment block are moved with the correction interface; and updating the preset delay duration based on the moving position.

2. The audio playing method of claim 1, further comprising:

determining a difference value between a first playing volume of the auxiliary speaker and a second playing volume of the main speaker; and determining the preset delay duration based on the difference value.

3. The audio playing method of claim 2, wherein the determining the preset delay duration based on the difference value comprises:

determining a preset difference range corresponding to the difference value; and obtaining a preset duration corresponding to the preset difference range as the preset delay duration.

4. The audio playing method of claim 1, wherein the updating the preset delay duration based on the moving position comprises:

determining a target adjustment ratio based on the moving position; and calculating a product between the target adjustment ratio and the preset delay duration to obtain an updated preset delay duration.

5. The audio playing method of claim 1, wherein the generating the sound effect correcting instruction comprises:

in response to detecting that a foreground application page is an audio playing page or a video playing page, generating a dedicated key on the foreground application page; and in response to detecting that a user clicks the dedicated key, generating the sound effect correcting instruction.

6. The audio playing method of claim 1, wherein the preset buffer is a region in a frame layer, a hardware abstraction layer, or a digital signal processing chip in the mobile terminal.

7. A non-transitory computer readable storage medium storing computer program which, when executed by a processor, causes the processor to perform operations comprising:

in response to detecting an audio signal to be played, storing the audio signal in a preset buffer while transmitting the audio signal to the auxiliary speaker to enable the auxiliary speaker to play the audio signal;

initiating a timer to start timing in a process of storing the audio signal; and in response to a timing duration for which the timing lasts reaching a preset delay duration, obtaining the audio signal from the preset buffer and transmitting the obtained audio signal to the main speaker to enable the main speaker to play the audio signal;

wherein the operations further comprise:

generating a sound effect correcting instruction;

displaying a correction interface on a display screen of the mobile terminal based on the sound effect correcting instruction, wherein the correction interface comprises a left channel bar, a right channel bar, a first adjustment block located on the left channel bar, and a second adjustment block located on the right channel bar;

obtaining a moving position of at least one of the first adjustment block and the second adjustment block when the at least one of the first adjustment block and the second adjustment block are moved with the correction interface; and updating the preset delay duration based on the moving position.

8. The non-transitory computer readable storage medium of claim 7, wherein the operations further comprise:

determining a difference value between a first playing volume of the auxiliary speaker and a second playing volume of the main speaker; and determining the preset delay duration based on the difference value.

9. The non-transitory computer readable storage medium of claim 8, wherein the determining the preset delay duration based on the difference value comprises:

determining a preset difference range corresponding to the difference value; and obtaining a preset duration corresponding to the preset difference range as the preset delay duration.

10. The non-transitory computer readable storage medium of claim 7, wherein the updating the preset delay duration based on the moving position comprises:

determining a target adjustment ratio based on the moving position; and calculating a product between the target adjustment ratio and the preset delay duration to obtain an updated preset delay duration.

11. The non-transitory computer readable storage medium of claim 7, wherein the generating the sound effect correcting instruction comprises:

in response to detecting that a foreground application page is an audio playing page or a video playing page, generating a dedicated key on the foreground application page; and in response to detecting that a user clicks the dedicated key, generating the sound effect correcting instruction.

12. The non-transitory computer readable storage medium of claim 7, wherein the preset buffer is a region in a frame layer, a hardware abstraction layer, or a digital signal processing chip in the mobile terminal.

13. A mobile terminal, comprising a memory and a processor; wherein the memory stores computer program that, when executed by the processor, causes the processor to perform operations comprising:

in response to detecting an audio signal to be played, storing the audio signal in a preset buffer while transmitting the audio signal to the auxiliary speaker to enable the auxiliary speaker to play the audio signal;

initiating a timer to start timing in a process of storing the audio signal; and in response to a timing duration for which the timing lasts reaching a preset delay duration, obtaining the audio signal from the preset buffer and transmitting the obtained audio signal to the main speaker to enable the main speaker to play the audio signal;

wherein the operations further comprise:

generating a sound effect correcting instruction;

displaying a correction interface on a display screen of the mobile terminal according to the sound effect correcting instruction, wherein the correction interface comprises a left channel bar, a right channel bar, a first adjustment block located on the left channel bar, and a second adjustment block located on the right channel bar;

obtaining a moving position of at least one of the first adjustment block and the second adjustment block when the at least one of the first adjustment block and the second adjustment block are moved with the correction interface; and updating the preset delay duration according to the moving position.

14. The mobile terminal of claim 13, wherein the operations further comprise:

determining a difference value between a first playing volume of the auxiliary speaker and a second playing volume of the main speaker; and determining the preset delay duration based on the difference value.

15. The mobile terminal of claim 13, wherein the determining the preset delay duration based on the difference value comprises:

determining a preset difference range corresponding to the difference value; and obtaining a preset duration corresponding to the preset difference range as the preset delay duration.

16. The mobile terminal of claim 13, wherein the updating the preset delay duration based on the moving position comprises:

determining a target adjustment ratio according to the moving position; and calculating a product between the target adjustment ratio and the preset delay duration to obtain an updated preset delay duration.

17. The mobile terminal of claim 13, wherein the generating the sound effect correcting instruction comprises:

in response to detecting that a foreground application page is an audio playing page or a video playing page, generating a dedicated key on the foreground application page; and in response to detecting that a user clicks the dedicated key, generating the sound effect correcting instruction.

* * * * *